Oct. 20, 1970     I. A. MacKINNON     3,534,888
DEVICES FOR DISTRIBUTING LIQUID AND METHODS
OF DISTRIBUTING LIQUID
Filed April 22, 1968

INVENTOR
IAN ARCHIE MacKINNON
BY
Mason, Mason & Albright
Attorneys

United States Patent Office 3,534,888
Patented Oct. 20, 1970

3,534,888
DEVICES FOR DISTRIBUTING LIQUID AND
METHODS OF DISTRIBUTING LIQUID
Ian Archie MacKinnon, Streetsville, Ontario, Canada, assignor to Lely Ltd., Burlington, Ontario, Canada
Filed Apr. 22, 1968, Ser. No. 723,171
Claims priority, application Netherlands, Apr. 21, 1967, 6705602
Int. Cl. A01c 15/00
U.S. Cl. 222—178                              6 Claims

ABSTRACT OF THE DISCLOSURE

According to the precent invention a device for distributing liquid includes a container, a pump and a distributor outlet. The container also has a suction pipe leading in a wall of the container above the bottom thereof and the pipe has a downwardly extending part situated in the container below liquid level so that a suction hose can be connected to the pipe and dirty air drawn in the container is filtered through the liquid.

According to another aspect of the present invention there is provided a method of utilising a device as just defined, wherein a layer of a liquid is provided in the container so that the lower end of the suction pipe is located in the liquid and the upper end projects above the liquid level, while air entrainment and dirt can be drawn into the hopper through the suction pipe.

For a better understanding of the invention and to show how the same may be carried into effect, reference will now be made, by way of example, to the accompanying drawing, in which.

Figure 1:
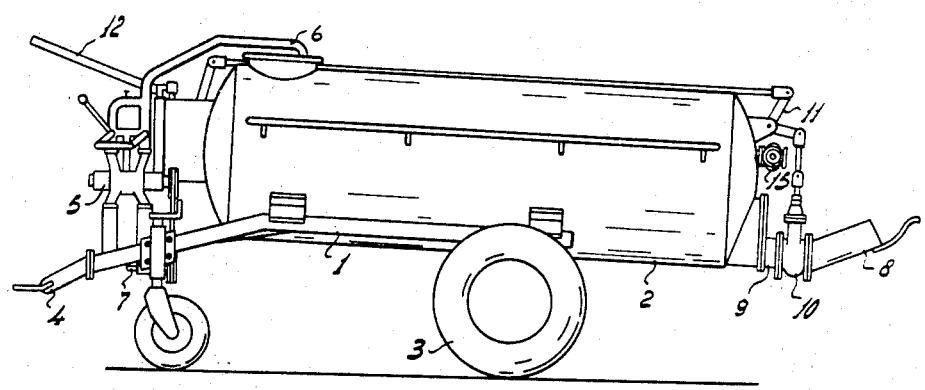
FIG. 1 is a side view of a transportable device for distributing liquid.

The device shown in the figures has a frame 1 on which an elongated cylindrical liquid container 2 is mounted. The frame 1 has two ground wheels 3, only one of which can be seen in FIG. 1, near the rear and a jockey wheel near the front. At the front the frame has a drawbar 4 by which the device can be attached to a vehicle, for example a tractor to be transported. The front portion of the frame supports a pump 5 that communicates through a duct 6 with the container 2. The pump 5 is connected with a driving shaft 7 which can be coupled with the power take-off shaft of the tractor propelling the device. On the rear of the liquid container 2 a spreading member 8 is provided that communicates with an outlet pipe 9 of the container 2. The outlet pipe 9 is provided with a closing member 10, which is linked by a rod system 11 to a lever 12 at the front of the device.

Figure 2:
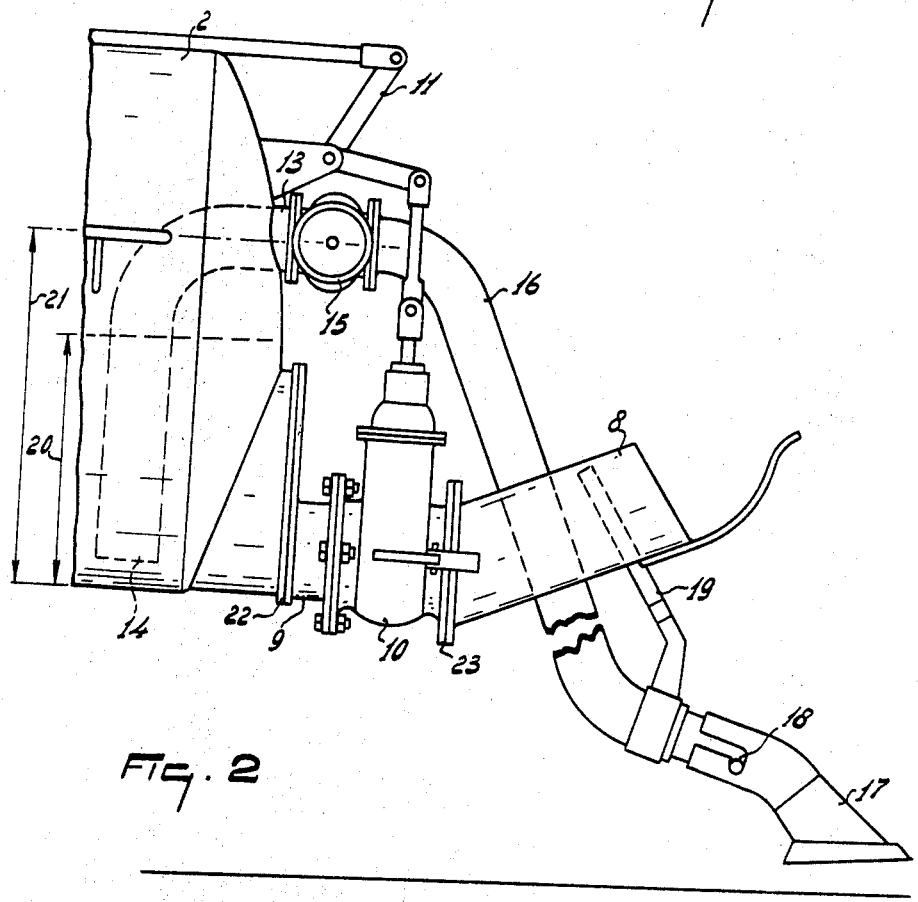
FIG. 2 is a side view, on an enlarged scale, of the rear portion of the device of FIG. 1.

On the rear of the container 2 a suction pipe 13 is passed through the rear wall at a height 21 above the bottom of the container. Inside the container 2 the suction pipe 13 is bent over so as to extend downwardly to its end 14, which end is near the bottom of the container 2. The suction pipe 13 is provided with a closing member 15 outside the container 2 and through which a hose 16 is detachably connected to the pipe 14 (FIG. 2). The hose 16 is connected with a suction nozzle 17 by a quick-release bayonet coupling 18. At the free end of the hose 16 there is provided a control-arm 19.

The device described above can both draw liquid into its container 2, and subsequently spread liquid therefrom. In order to draw liquid in, the spreading member 8 is removed so that a hose (not shown) can be attached to the closing member 10. The pump 5 is then put into operation via the shaft 7 by the tractor, air is withdrawn from the container 2 through the duct 6, and thus liquid can be sucked into the container 2 through the hose attached to the closing member 10 which is opened at this time. Thereafter the closing member 10 is closed to enable the hose to be removed. Subsequently the liquid in the container can be spread, under pressure, after the spreading member 8 has been put in its place, the closing member 10 opened, and the liquid in the container 2 subjected to pressure by the pump 5.

A different use may be made of this device by providing a layer of a liquid, for example, water in the container 2, with the closing member 10 closed, so that the lower end 14 of the pipe 13 extends into the liquid. The liquid may have the depth 20 indicated in FIG. 2. By pumping air out of the container 2 with the closing member 15 open, air will be drawn-in through the hose 16. The device may thus be employed as an industrial vacuum cleaner the nozzle 17 being pushed along the floor to be cleaned.

The device, which is particularly suitable for working mixed manure, may be very effectively employed on farms, while also in this case it may be useful as a vacuum cleaner, for example, for cleaning stables and barns. The nozzle 17 may be replaced by other types of nozzles for use as suction nozzles.

When the device is used as a vacuum cleaner, the dirt drawn-in will be collected in the liquid in the container. When a sufficient quantity of dirt has been drawn-in, the liquid may be spread with the dirt, if desired, by conducting away the liquid under pressure via the spreading member 8 in the manner already described.

In the device shown in the figures the suction pipe 13 is arranged at the height 21 above the bottom of the container 2, which height exceeds half the height of the container, but it may be disposed at a lower level but still so that the lower end of the pipe extends into a liquid layer provided in the container. As an alternative, the suction pipe 13 may be secured to a cap 22 to which the outlet pipe 9 is also secured. This cap 22 may, if desired, be rotatably mounted on the container 2 so that the outlets of the pipes 9 and 13 secured to the cap 22 are readily accessible, for example, for cleaning purposes. It is furthermore possible to connect to a flange 23 of the closing member 10 (to which the spreading member 8 is also connected) a pipe which extents upwardly over a distance, for example, equal to half the height of the container 2. This pipe may be provided at the upper end with a suction hose with a suction nozzle replacing the hose 16 and nozzle 17 already described. In this latter construction, when the closing member 10 is opened, the liquid in the container 2 will not reach the upper end of the pipe providing the layer of liquid in the container is below the upper end of the pipe, so that the device may serve as a vacuum cleaner in the manner already described. When the device is not used as a vacuum cleaner, the pipe with the nozzle may be removed.

Having thus described my invention, what I claim as new and desire to secure by Letters Patent of the United States is:

1. A spreading device transportable over the ground, said device comprising a container, a pump with a conduit connected to the upper part of said container whereby air can be pumped into said container and sucked out from said container, said container having an opening at the lower end thereof through which material can be drawn in and pressured out of said container, a closing member included in said opening to close and open same, an air entrainment suction pipe being connected to said container above said opening, said suction pipe having a part extending within said container and said part having an end portion directed downwardly in said container below the normal liquid level, said suction pipe having a second closing member, for closing and opening said suction pipe relative to said container, an air suction hose being connectable to one end of said suction pipe outside of said container whereby air and entrainment can be sucked in said hose through said end portion and filtered through liquid in said container.

2. A device as claimed in claim 1, wherein said suction pipe part extends down to terminate adjacent the bottom of said container.

3. A device as claimed in claim 1, wherein said suction pipe is connected at one end of said container approximately at half the height thereof, said part in said container being bent downwardly from said connection.

4. A device as claimed in claim 1, wherein said second closing member of said suction pipe is located at one end of said suction pipe outside said container, and said suction hose is connectable to the opposite side of said second closing member.

5. A device as claimed in claim 1, wherein a control arm is connected to said suction hose adjacent a nozzle.

6. A device as claimed in claim 1, wherein said opening and said suction pipe are both located at the rear end of said container and rod means extends from said first-mentioned closing member to the front end of said device.

References Cited

UNITED STATES PATENTS

| | | | |
|---|---|---|---|
| 701,536 | 6/1902 | Brunau | 169—24 |
| 2,573,179 | 10/1951 | Brodie | 239—148 |
| 1,986,476 | 1/1935 | Ironside | 141—28 |
| 2,488,946 | 11/1949 | Turpin | 141—25 |
| 2,751,123 | 6/1956 | Kuhles et al. | 222—176 |
| 2,755,969 | 7/1956 | Rainero | 141—25 |
| 3,343,199 | 9/1967 | Nolte | 141—26 |

FOREIGN PATENTS

| | | |
|---|---|---|
| 22,212 | 4/1935 | Australia. |
| 722,617 | 1/1955 | Great Britain. |

ROBERT B. REEVES, Primary Examiner

H. S. LANE, Assistant Examiner

U.S. Cl. X.R.

141—26; 222—394; 239—148